(12) United States Patent
Eichen et al.

(10) Patent No.: US 6,940,849 B2
(45) Date of Patent: Sep. 6, 2005

(54) SYSTEM AND METHOD FOR IP TELEPHONY PING

(75) Inventors: Elliot Eichen, Arlington, MA (US);
Robert Israel, Westford, MA (US);
Evegeni Belin, Framingham, MA (US);
Robert Olshansky, Wayland, MA (US)

(73) Assignee: Level 3 Communications, Inc., Broomfield, CO (US)

( * ) Notice: Subject to any disclaimer, the term of this patent is extended or adjusted under 35 U.S.C. 154(b) by 152 days.

(21) Appl. No.: 10/417,415

(22) Filed: Apr. 16, 2003

(65) Prior Publication Data

US 2004/0208186 A1 Oct. 21, 2004

(51) Int. Cl.[7] ............................................. H04L 12/66
(52) U.S. Cl. ...................................... 370/352; 370/401
(58) Field of Search ................................ 370/352, 353, 370/354, 355, 356, 248, 249, 259, 261, 271

(56) References Cited

U.S. PATENT DOCUMENTS

| | | | |
|---|---|---|---|
| 6,298,045 B1 * | 10/2001 | Pang et al. ................. 370/261 |
| 6,563,816 B1 * | 5/2003 | Nodoushani et al. ....... 370/352 |
| 6,584,110 B1 * | 6/2003 | Mizuta et al. .............. 370/401 |
| 6,697,475 B1 * | 2/2004 | MeLampy et al. ..... 379/201.12 |
| 6,757,823 B1 * | 6/2004 | Rao et al. .................. 713/153 |

* cited by examiner

Primary Examiner—Hassan Kizou
Assistant Examiner—Albert T. Chou
(74) Attorney, Agent, or Firm—Faegre & Benson LLP (57) ABSTRACT

The present invention provides a system and method for establishing the availability of a node to received a voice over internet protocol (VoIP) call. The present invention comprises attempting to establish a VoIP call to a given node that is the target of the VoIP call, determining whether the attempt to establish the VoIP call is successful; and generating an alarm in response to a call failure. According to embodiments of the invention, the method may comprise extracting call metrics from a VoIP call that provide information regarding the quality of a VoIP connection and generating an alarm in response to the call metrics falling below a threshold.

33 Claims, 5 Drawing Sheets

SYSTEM AND METHOD FOR IP TELEPHONY PING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to verifying communications paths on a network. More particularly, the present inventions relate to the establishment of a connection of a Voice of Internet Protocol (VoIP) call to verify that a set of one or more given endpoints are available to receive a call.

The Open Systems Interconnection (OSI) specification provides a "reference model" for how messages should be transmitted between any two points in a telecommunication network. The purpose of the model is to guide product technology implementors so that their products will consistently work with other products. The reference model defines seven layers of functionality that take place at each end of a communications link. Layer 3 (L3) refers to the network layer of the model, which is concerned with knowing the address of neighboring nodes in a network, selecting routes and quality of service, and recognizing and forwarding to the transport layer incoming messages destined for the local host. An Internet Protocol (IP) address is one example of a layer 3 address.

Ping (Packet Internet or Inter-Network Groper) is a tool used to verify that a given IP address exists and can accept requests. Users and software processes employ Ping to diagnostically ensure that a host computer that the user is attempting to reach is actually operating. Ping may also be used to communicate with an operating host in order to determine the amount of time required to receive a response from the host, as well as other related statistics. The Ping software utility sends an Internet Control Message Protocol (ICMP) packet to a specified IP network address or a qualified domain name. ICMP is an extension to the IP protocol that supports packets with error, control and informational messages. The utility waits for replies from the address in response to receipt of the ICMP packet. In addition to the data described above that is provide by Ping, the software is useful in troubleshooting Internet connections as well as determining the quality of a network connection.

In the realm of IP telephony or VoIP, however, no equivalent to the Ping utility exists whereby users may receive information regarding the ability of a host to respond to a VoIP call, the ability of the network to route VoIP packets, or the quality of the network connection. Furthermore, conventional Ping utilities provide information regarding L3 connectivity, but not whether high layer applications are working, which is important in the realm of VoIP telephony.

There is thus a need for a system and method that provides an application layer test that also provides information regarding the availability or operation of higher layer network services, e.g., VoIP telephony services.

BRIEF SUMMARY OF THE INVENTION

The system and method of the present invention, which may be embodied in various combinations of interoperating hardware and software components, provides a mechanism for testing the availability of network resources, e.g., VoIP terminals used to place and receive telephone communications from both other VoIP terminals on packet based networks and traditional "dumb" telephone handsets linked via the public switched telephone network, which is a switch based network.

According to one embodiment, the invention comprises a system for establishing the availability of a node to receive a Voice over Internet Protocol (VoIP) call. The system of the present invention comprises one or more VoIP nodes, each VoIP node identified by an address. A VoIP ping server, and the VoIP nodes, are attached to a network capable of facilitating voice communications according to protocols well known to those of skill in the art, such as, but not limited to, the Session Initiation Protocol, H.323 protocol, Media Gateway Control Protocol, etc. The VoIP ping server executes VoIP ping software operative to attempt a VoIP call to a given one of the one or more VoIP nodes over the network. The VoIP ping software is further operative to generate an alarm in response to a call failure.

The VoIP ping software is readily capable of testing connections to VoIP nodes according to a variety of address types. A VoIP node may be identified by an E.164, e.g., an address in a format according to standard telephone numbering systems traditionally associated with switched telephone equipment, or a private number dial plan address such as those used by PBX systems. Alternatively, or in conjunction with other addressing schemes, a VoIP node may be identified by a Session Initialization Protocol Uniform Resource Locator or Media Gateway Control Protocol endpoint name.

The VoIP ping software may extract call metrics from the call that the VoIP ping software attempts. Exemplary call metrics include, but are not limited to, the amount of time required to set up the call (post-dial delay), voice quality measurements (PAMS/PSQM measurements, etc.), packet loss and latency, echo, etc. According to one embodiment, the VoIP software extracts call quality metrics from successful calls, the metrics providing information regarding the quality of a VoIP connection. Advantageously, where call quality metrics fall below a threshold, the VoIP software generates an alarm for transmission to the Network Operations Center.

The present invention also contemplates a system that provides a high availability architecture for establishing the availability of a node to receive a voice over internet protocol (VoIP) call. As with other embodiments, the system according to this embodiment comprises one or more VoIP nodes, each VoIP node identified by an endpoint address for testing purposes. Also attached to the network is a plurality of work distributors operative to maintain endpoint addresses. The plurality of work distributors may maintain the endpoint addresses according to one or more formats selected from the group comprising an E.164 address, a private dial plan address, a SIP URL and a MGCP address.

In order to maintain a consistent set of endpoint addresses between work distributors, the plurality of work distributors synchronize or replicate the endpoint addresses among each other. A plurality of VoIP ping servers executing VoIP ping software each retrieve or are provided with an endpoint address from a given one of the plurality of work distributors. Using the endpoint address that the VoIP ping software retrieves, it attempts a VoIP call to the endpoint address and stores a result of the VoIP call. Advantageously, the VoIP ping software may extract call metrics from a successful call that provide information regarding the quality of a VoIP connection.

The result of the VoIP call executed by the VoIP ping software, including any collected call metrics, is passed to a given one of a plurality of result merger agents. The given result merger agent receiving these data performs analysis on the results and generates an alarm in response to a call failure. Because there is a plurality of result merger agents, each result merger agent synchronizes the data it receives with the data that other result merger agents receive to remove duplicative data and allow each result merger agent to maintain a unified set of result information, which, for example, ensures data availability in the event that one or more result merger agents fail. Similarly, a result merger agent is operative to receive call metrics from a successful call that provide information regarding the quality of a VoIP connection, analyze the metrics against a set of threshold data and generate and alarm in response to one or more call metrics falling below a given threshold within the set of threshold data. Each result merger agent synchronizes the data it receives with the data that other result merger agents receive to remove duplicative data and allow each result merger agent to maintain a unified set of result information.

The present invention further contemplates methods of operating embodiments of the system of the present invention. According to one embodiment, the invention provides a method for establishing the availability of a node to receive a voice over internet protocol (VoIP) call. The method comprises attempting to establish a VoIP call to a given node that is the target of the VoIP call and determining whether the attempt to establish the VoIP call is successful. In response to a call failure, an alarm is generated, which, for example, may be generated by the VoIP ping software or the result merger agent analyzing a plurality of call attempts performed by instances of VoIP ping software executing throughout the network. Transmission of the alarm to a NOC or system administrator allows for identification and swift resolution of the call failure.

Attempting to establish the VoIP call requires an endpoint address. According to embodiments of the invention, attempting to establish a VoIP call comprises dialing one or more of an E.164 address, a private number plan address, a Session Identification Protocol URL, MGCP endpoint address, etc. When the attempting step is executed, a given protocol must be implemented in order to resolve the address and complete the VoIP call. The invention may be used in conjunction with any given existing or emerging voice protocols, for example, the H.232 protocol and the Session Initiation Protocol. Regardless of the protocol or address type employed to conduct the VoIP ping, call teardown is performed once the VoIP ping is established. The steps of attempting, determining and generating may be conducted at periodic intervals.

The method discussed herein may also comprise extracting call metrics from a VoIP call that provide information regarding the quality of a VoIP connection. Exemplary call metrics that may be collected include, but are not limited to, the amount of time required to set up the call (post-dial delay), voice quality measurements (PAMS/PSQM measurements, etc.), packet loss and latency, echo, etc. Accordingly, alarms may be generated in response to one or more of the call metrics falling below a threshold.

The systems and methods of the present invention may be used to provide a customer or administrator with frequently updated performance reports on network availability. For example, a web site may provide information the comprises the call quality parameters, which receives periodic updates with performance information showing the percentage of successful calls reported by the VoIP ping software to each VoIP terminal during the period. In addition to providing customers with assurance that a given VoIP terminal, or a VoIP service in general, has high availability, the present invention may also provide assurance that direct VoIP calls that fail may be routed over the public switched telephone network.

The call quality parameters collected by the VoIP ping software executing on the VoIP ping server may further be used to provide users with a guaranteed Service Level Agreement (SLA). For example, a service provider may offer a customer one day's credit if the availability level as measured by a VoIP ping falls below 99.99% and a 10-day credit if the availability falls below 99.97%.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
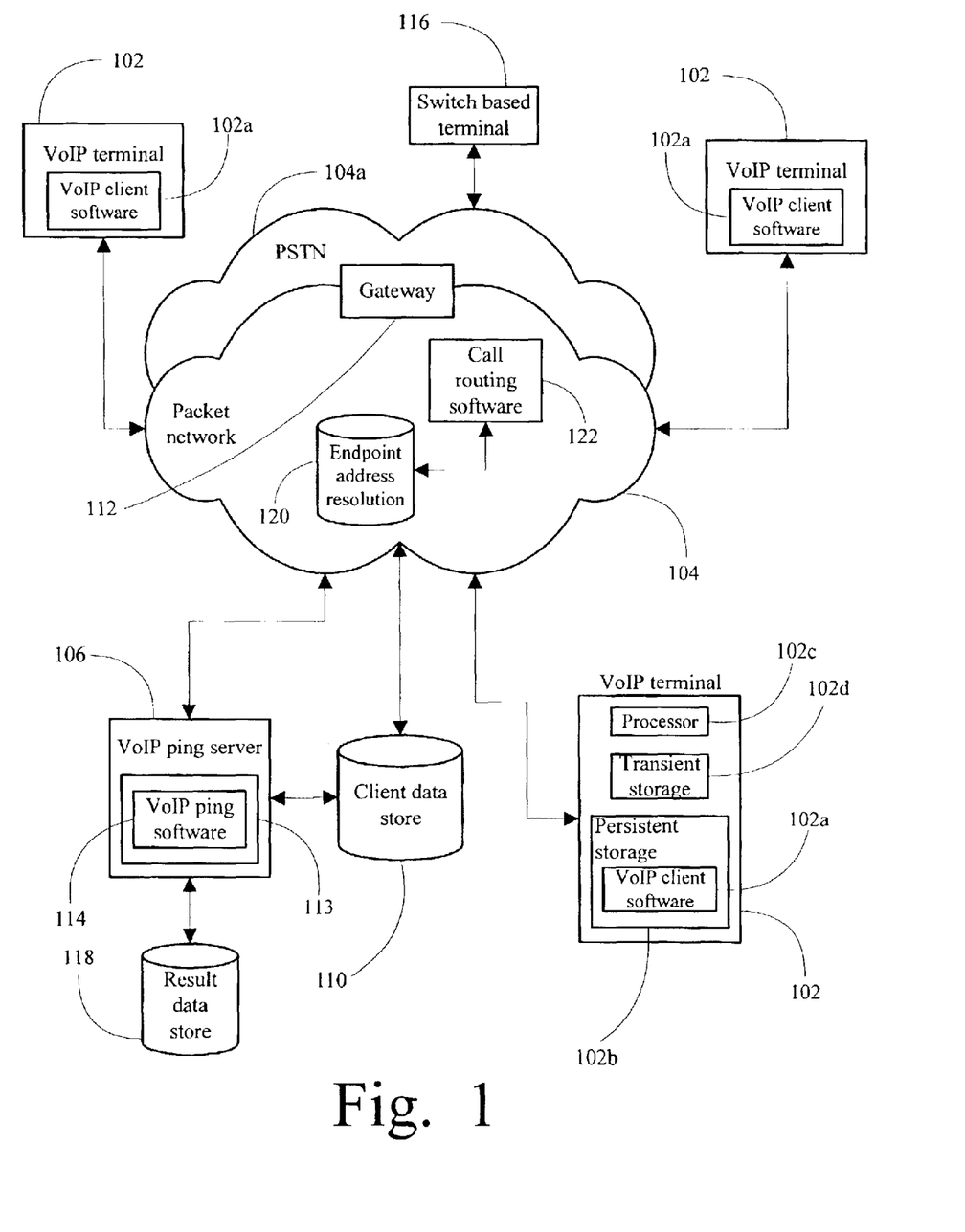
FIG. 1 is a block diagram presenting a system for performing an IP telephony ping according to one embodiment of the present invention.

With reference to FIGS. 1 through 5, embodiments of the invention are presented. FIG. 1 presents one configuration of the hardware and software components for performing an IP telephony ping according to an embodiment of the present invention.

A VoIP implementation comprises a number of VoIP terminals 102 each executing and preferably maintaining VoIP client software 102a. A VoIP terminal 102 may comprise a general-purpose personal computer that has audio input and output capabilities, as well as persistent 102b and transient 102d storage and a microprocessor 102c working in conjunction to maintain and execute the VoIP client software 102a. Although these components are only shown in conjunction with one VoIP terminal, it will be understood by one of skill in the art that each VoIP terminal comprises these components. The VoIP terminal may also comprise a telephone that understands the Internet Protocol (IP), such as a solution that provides complete functionality for an IP telephone set residing on a LAN. These devices integrate all the requisite functionality to interface directly to an Ethernet network, telephone handset, speakerphone, PDA, and other user interfaces.

According to one embodiment of the invention, the VoIP client software 102a that each VoIP terminal 102 executes adheres to the H.323 standard, which provides a foundation for audio, video and data communications across IP-based networks. The H.323 standard and its related annexes, available from the H.323 Forum at www.h323forum.org and at the International Telecommunication Union at www.itu.int, is hereby incorporated by reference herein in its entirety. Alternatively, the invention may be implemented using other telecommunications standards including, but not limited to, the Session Initiation Protocol (SIP), Media Gateway Control Protocol (MGCP) and other well-known protocols for transporting voice and similar audio data over telecommunications networks. Information regarding the SIP standard is available at www.ietf.org/rfc/rfc2543.txt and the Media Gateway Control Protocol standard is available at http://www.ietf.org/rfc/rfc3435.txt and http://www.ietf.org/rfc/rfc2805.txt, all of which are incorporated by reference herein in their entirety.

VoIP terminals 102 initiate communications over an IP based packet switched network 104. Each VoIP terminal is assigned or provided with an address, such as an E.164 address, which is defined in the International Telecommunication Union's international public telecommunication numbering plan, available at http://www.itu.int/ITU-T/publications/index.html and incorporated herein by reference in its entirety. When an E.164 address is supplied to the VoIP client software 102a, an attempt is made to connect to the destination address. Call routing software 122 attempts to resolve the destination indicated by the address and route the call. Where successful, the two endpoints 102 connect and voice or other multimedia communication commences. Similarly, each VoIP terminal 102 may communicate with switch based terminals 116 such as a standard telephone, well known to those of skill in the art, connected to the public switched telephone network (PSTN) 104a. A gateway 112 acts as a bridge between the packet network 104 and the PSTN 104a in order to translate the packet based data for transport over the PSTN 104a, and vice versa.

According to one embodiment of the present invention, a VoIP ping server 106 is available to provide users of VoIP terminals 102 or a NOC with knowledge regarding the status of another given VoIP terminal according to its address. The VoIP ping server 106 is in communication with a client data store 110 comprising a set of VoIP endpoint data for all VoIP terminals 102 that the VoIP ping server 106 is to test or vping. An exemplary but not limiting set of endpoint forms that the client data store 110 may maintain is presented below in Table 1:

TABLE 1

| Endpoint address type | Protocol | Example |
| --- | --- | --- |
| IP address | SIP/H.323 address | 4.17.35.126 |
| E.164 | SIP/H.323 address | 17815551212 |
| H.323 ID | H.323 | |
| SIP URL | SIP | SIP:moe@3stooges.com |
| MGCP endpoint name | MGCP | |

The VoIP client data store 110 may comprise any number of well know data storage paradigms, such as, tab, comma or similarly delimited flat file data structures, a relational database, an object-oriented database or a hybrid object-relational database. The client data store 110 may be in direct communication with the VoIP ping server 106, such as a relational database maintained locally by the VoIP ping server 106. Alternatively, the client data store 110 may be maintained remotely, the VoIP ping server 106 accessing the data store 110 over a local or wide area packet based network 104, for example, the Internet.

VoIP ping software 114 resides on a storage device 113 and accesses the client data store 110 to retrieve a set of endpoint address information for VoIP terminals 102 that the VoIP ping server 106 is to test and periodically attempts to initiate communication with them, e.g., attempts to perform a VoIP ping, also referred to herein as a vping. The VoIP ping software 114 retrieves an endpoint address from the client data store 110 and attempts to call the address using the address format returned from the client data store 110, e.g., a SIP URL or IP address. Call routing software 122 that comprises part of the packet network infrastructure 104 for support of VoIP services receives the call request and attempts to resolve the address that the VoIP ping server 106 provides, which is accomplished using data stored in an endpoint address resolution data store 120. VoIP address resolution may be considered loosely analogous to well known address resolution techniques performed by DNS services, e.g., whereby a web browser provides a textual URL to the service, which is translated into IP "dot" address that devices comprising the network expect, e.g., www.yahoo.com may translate to 66.218.71.88.

The VoIP ping software 114 attempts to set up a call or vping to a given address so as to verify that the number or address is reachable, e.g., that the network is properly resolving addresses and the endpoint is capable of receiving a call. If the given VoIP terminal 102 responds with an affirmative message to the VoIP ping software 114 indicating that the call has been completed, e.g., an H.323 "call connect" message, SIP "OK" message, etc., the software 114 interprets this as a successful call and performs call tear down, which is a mechanism for ending a call after it is established. If there is no affirmative message that the call is accepted, or if the call is rejected, e.g., an H.323 ARJ received or SIP 503 service unavailable response, etc., the software 114 determines that call has failed. The VoIP ping software 114 also records the success or failure of the VoIP ping, which is made available to users, administrators, other software processes, the NOC, etc. This call completion data is stored in a result data store 118, which may comprise data stores and structures well known to those of skill in the art, e.g., a relational database.

Where call signaling is successful, the VoIP ping software 114 may perform call quality measurements to provide enhanced data regarding a given VoIP terminal 102. The VoIP ping software 114 comprises mechanisms to perform measurements, vary media flow and extract data from the call process that provides information regarding the quality of a VoIP connection. Exemplary call quality parameters or metrics include, but are not limited to, the amount of time required to set up the call (post-dial delay), voice quality measurements (PAMS/PSQM measurements, etc.), packet loss and latency, echo, etc. In addition to recording and exporting the success or failure of the VoIP ping, the VoIP ping server records and exports call quality parameters based on the call setup and measurement processes, which may be maintained in the result data store 118 in addition to being transmitted to a Network Operations Center (NOC) for further action. Alternatively, the call and quality measurement process may be executed "on demand" by a network administrator or similar network engineer whereby the vping is executed in response to a command that the VoIP ping software receives. The VoIP ping software then returns the results to the party initiating the vping.

The VoIP ping software 114 is configured to broadcast alarms to a network administrator or supervising software process, e.g., the NOC for a given network or networks, in the event that one or more VoIP pings result in failure that exceeds a threshold. Flexibility is provided that allows the administrator to configure the failure threshold beyond which an alarm is broadcast. For example, according to one embodiment of the invention, an alarm is broadcast to the NOC alerting an administrator that one or more VoIP terminals 102 or switch-based terminals 116 are not available if N consecutive VoIP pings result in failure. Alternatively, or in conjunction, the VoIP ping software 114 may generate and broadcast alarms based on various thresholds regarding the call setup and measurement processes. Because failures may occur in different places during a call, the VoIP software 114 may advantageously enrich the call failure alarm with various call quality parameters that it collects during the call process, e.g., to provide information to the NOC regarding where the call has failed.

Exemplary syntax for a VoIP ping command is presented in Table 2:

TABLE 2 vping 17815557273 -p sip -a test1.sip.pcs.com -n 3

According to this syntax, "vping" indicates a call to the VoIP ping software, typically executing on a VoIP ping server, although the application may be maintained and executed on any number of computing platforms. "17815557273" indicates the E.164 address to be vpinged, which refers to a standard telephone number. The "-p" flag indicates the protocol to be used by the software, in this instance, the Session Initiation Protocol. The "-a" flag and associated qualified domain address specifies the network capability used to resolve the endpoint IP address whereas the "-n" flag indicates the number of times the software is to execute or attempt the vping.

The VoIP ping command introduced in Table 2 might produce the following exemplary results as set forth in Table 3:

TABLE 3 reply from 17815551212 [171.117.140.81] connect time = 60 ms
or
reply from sip:moe@sizlack.com [171.117.104.81] connect time = 63 ms
call request time out
call request rejected
address resolution time out
vping statistics for 17815557273:
  Calls: sent = 5, connected = 3, Lost = 1 (20% loss)
  rejected = 1 (20% rejected)

According to these results, "reply" indicates that the host identified by the address was properly resolved by the network's call routing software 122 to complete the call request, e.g., that the call was successfully connected, and that the call from beginning to end took 63 ms to process. The "call request time out" line indicates that the call was unable to be setup prior to timing out by the sender or the receiver, whereas "call request rejected" indicates that the remote VoIP terminal that is the endpoint for the vping rejected the call request. The line "address resolution timed out" refers to the fact that a response for network address resolution was not received prior to the default timeout.

Figure 2:
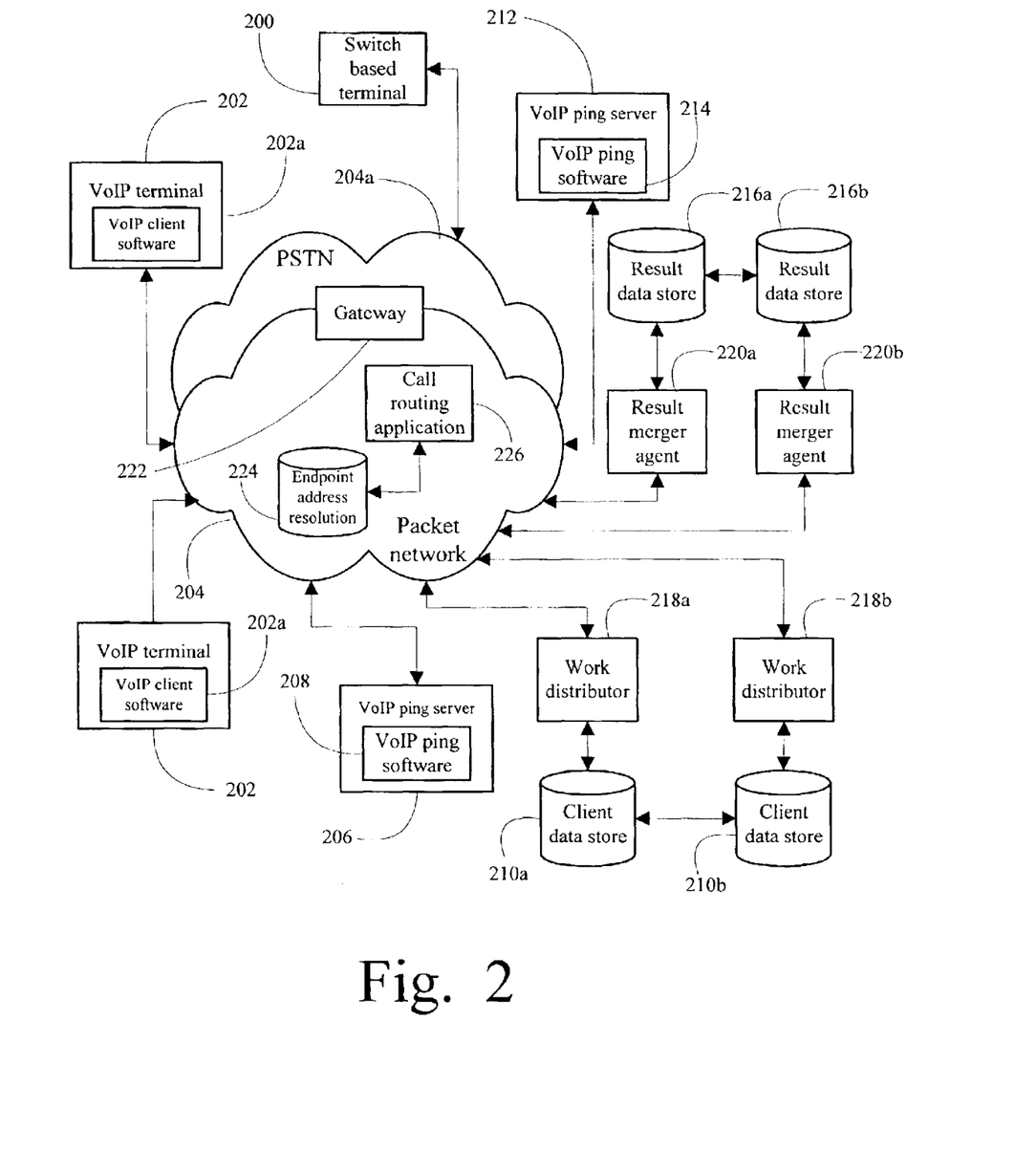
FIG. 2 is a block diagram presenting a system for performing an IP telephony ping according to an alternative embodiment of the present invention.

Building on the architecture for performing a VoIP ping presented in FIG. 1, an alternative high availability architecture based on multiple VoIP ping servers is presented in FIG. 2. A plurality of VoIP terminals 202 execute VoIP client software 202a in order to initiate and conduct voice communications over a packet network 204, such as a local area network or the Internet. The network infrastructure 204 comprises call routing software 226 for support of VoIP services. The call routing software 226 receives the call request and attempts to resolve the address that the VoIP terminal 202 provides, which is accomplished using data stored in an endpoint address resolution data store 224. A gateway 222 provides a communications connection between the packet network 204 and a circuit switched network 204a, such as the PSTN, to allow the VoIP terminals to communicate with devices that connect to the PSTN, e.g., the ubiquitous analog or digital telephone switch based terminals 200.

As in FIG. 1, a VoIP ping server 212 comprising VoIP ping software 214 is in communication with VoIP and switch based terminals 200 and 202 to periodically test the availability of selected terminals. The VoIP ping server 212 and software 214 are in communication with a work distributor 218a and 218b that transmits addresses information for each VoIP terminal 202 that the VoIP ping server 212 is to call. The VoIP ping software 214 executing on the VoIP server 212 retrieves or receives one or more addresses from the work distributor 218a and 218b and attempts to vping each address, e.g., establish a VoIP call. The VoIP ping software 214 collects data regarding the each VoIP terminal 202 that it vpings, e.g., call success or failure in addition to other call metrics enumerated previously. The VoIP ping software 214 queues the resultant vping data, which it periodically sends to a result merger agent 220a and 220b for analysis and alarm propagation to the NOC.

A second VoIP ping server 206, typically executing a distinct instance or copy of the VoIP ping software 208, operates in parallel with other VoIP ping servers, e.g. 212, that are vpinging addresses of VoIP terminals 202, E.164 addresses or SIP URLs. The VoIP ping server 206 and software 208 are in communication with a work distributor 218a and 218b that transmits addresses for each VoIP terminal 202 that the VoIP server 206 is to vping. The VoIP ping software 208 executing on the VoIP server 206 retrieves one or more addresses from the work distributor 218a and 218b and attempts to vping each address, e.g., establish a VoIP call to a VoIP terminal 202 using an address for the given terminal that the work distributor 218a and 218b provides. The VoIP ping software 208 collects data regarding the each VoIP terminal 202 that it vpings, e.g., call success or failure in addition to other call metrics enumerated previously. The VoIP ping software 208 queues the resultant vping data, which it periodically sends to a result merger agent 220a and 220b for analysis and alarm propagation to the NOC.

A plurality of work distributors 218a and 218b are in communication with the VoIP servers 206 and 212 and comprise address information in an associated client data store 210a and 210b for each VoIP terminal 202 that the VoIP servers 206 and 212 are to vping. The work distributor 220a and 220b fetches address information that is passed over the network 204 to the appropriate VoIP ping server 206 and 212 that is testing VoIP terminals 202 based on a given addressing scheme for the terminal stored in the client data store 210a and 210b. Because each VoIP ping server 206 and 212 operates independently of the other, the VoIP ping software 208 and 214 may independently determine the optimal work distributor 218a and 218b from which to receive address information.

When one work distributor on the network 204 fails, e.g., 218a, the VoIP ping software 208 and 214 may select an alternative work distributor, e.g., 218b, from which to receive address information. In this manner, the system of the present invention provides for high availability of vping services. Each work distributor 218a and 218b maintains its own client data store, 210a and 210b, respectively. Each client data store 210a and 210b operates data management software well know to those of skill in the art, such as RDBMS software, to manage data contained therein as well as to replicate data between the data stores to ensure that each data store maintain and accurate and complete list of test addresses.

Each VoIP ping server 206 and 212 vpings VoIP terminals 202 according to the addresses that it receives or retrieves from a given work distribution 218a and 218b on the network 204. The result of the vping is queued by the VoIP software 208 and 214 and periodically sent to a result merger agent 220a and 220b for analysis and alarm propagation to the NOC where appropriate. Because each VoIP ping server 206 and 212 operates independently of every other VoIP ping server on the network 204, the VoIP ping software 208 and 214 may independently determine the optimal result merger agent 220a and 220b to which it will transmit address information. When one a result merger agent on the network 204 fails, e.g., 220a, the VoIP ping software 208 and 214 may select an alternative result merger agent, e.g., 220b, to which it transmits address information. In this manner, the system of the present invention provides for high availability of vping services. Each result merger agent 220a and 220b maintains its own result data store, 216a and 216b, respectively. Each result data store 216a and 216b operates data management software well know to those of skill in the art, such as RDBMS software, to manage data contained therein as well as to replicate data between the data stores to ensure that each data store maintain and accurate and complete set of resultant vping data.

A given result merger agent 220a and 220b is configured to broadcast alarms to a network administrator or supervising software process at the NOC in the event that one or more VoIP pings result in failure state that exceeds a given threshold. Flexibility is provided to allow the administrator to configure the failure threshold beyond which an alarm is broadcast. For example, an alarm is broadcast to the NOC alerting an administrator that one or more VoIP terminals are not available if N consecutive VoIP pings result in failure. Alternatively, or in conjunction, the VoIP ping software may generate and broadcast alarms to the NOC based on various thresholds regarding the call and call measurement processes.

According to an alternative embodiment, each VoIP ping server 206 and 212 accessing VoIP terminals 202 according to addresses that they received from a given work distributor operate in tandem with a backup set of VoIP ping servers whereby each of the pair of VoIP ping servers is responsible for placing periodic vping calls to the portion of the addresses that they receive from the work distributor 218a and 218b. According to this embodiment, a primary VoIP ping server executes the vping calls while the backup VoIP ping server verifies that the primary server is functioning. Where the backup is unable to verify that the primary server is functioning, the backup server performs the vping and generates the vping result data, e.g., call quality parameters, until the primary is functioning. The result merger agent 220 collects the queued results from both primary and backup servers, delivering any required alarms to an administrator or the NOC. These configurations are useful for supporting high volume vpings that a single VoIP ping server cannot easily support and for providing reliable and continuous vping service availability to assist in supporting customer Service Level Agreements (SLA).

Figure 3:
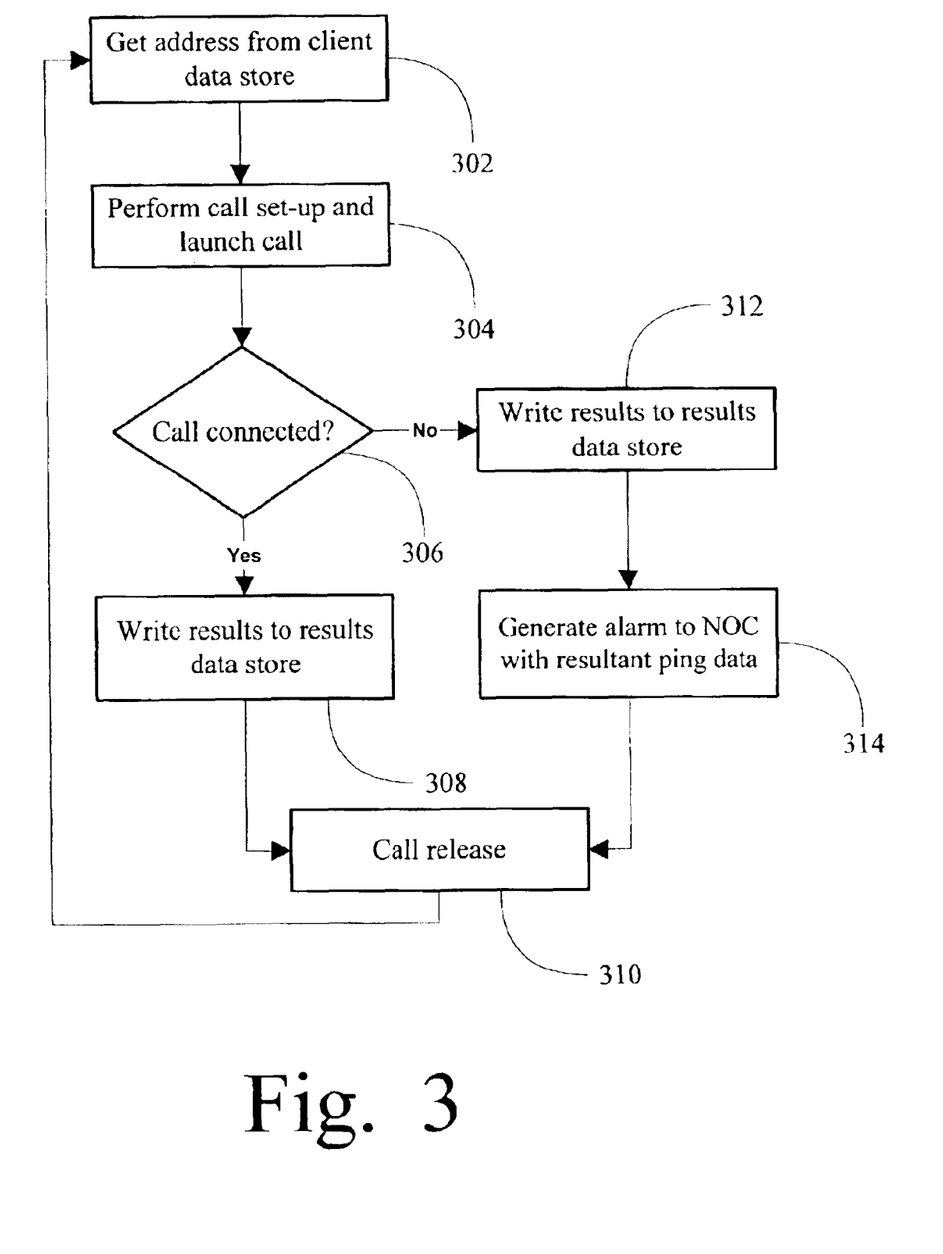
FIG. 3 is a flow diagram presenting a high level method for performing an IP telephony ping according to one embodiment of the present invention.

One embodiment of a method for operating the systems illustrated in FIGS. 1 and 2 is presented in FIG. 3. In order to perform a VoIP ping, VoIP ping software operating on a VoIP ping server retrieves an address of a VoIP terminal to vping from its client data store, step 302. Based on the address information that the VoIP terminal retrieves from its client data store, software executing on the VoIP terminal launches the call into the network, which performs address resolution, step 304. Address resolution generally refers to a mechanism to determine the IP address of a VoIP terminal for a given address, e.g., an E.164 telephone number, SIP URL, H.323 identifier or other protocol tag that identifies the device that the VoIP ping server is to vping.

The VoIP software performs call setup in order to conduct the vping, step 304. Call setup is a mechanism to exchange information necessary to place a call to a VoIP terminal identified during call launch step 304, which is dependent upon the protocol that is being implemented. For example, the VoIP software may run the H.323 session protocol to establish transmission and a reception channel for each direction over a packet network. If a Private Branch Exchange (PBX) is handling the call, the PBX forwards the call to the destination telephone. Similarly, where Resource Reservation Protocol (RSVP) is configured, the RSVP reservation is put into effect to achieve the destined Quality of Service (QoS) over the packet network.

Once the call is transmitted over the network for call completion, e.g., address resolution, the VoIP software performs a check to determine the connection status of the call, step 306, for example, whether or not the network successfully resolved the address of the terminal that the VoIP ping software provides or whether the call is successfully routed to the destination terminal. Where the call is successful, step 306, the VoIP ping software writes the resultant vping data to its result data store, step 308. If, however, the call is unsuccessful, the results are written to the result data store, step 312, and the VoIP software generates an alarm comprising the vping data to the NOC, step 314. Alternatively, a subroutine (not pictured) may write data to the result data store at step 312 indicating the number of times a vping to the given address has failed or a similar flag. A check may be performed prior to step 314 whereby the rate of failure for a given address is compared against a threshold to determine whether the VoIP ping software should generate an alarm. Regardless of whether or not a call is successful, step 306, the call is torn down, step 310. Call tear down ends the current session whereby the VoIP ping server enters and idle state waiting for the VoIP ping software to generate an off hook condition to trigger another call setup, step 302, based on a subsequent address retrieved from the VoIP ping server's client data store.

Figure 4:
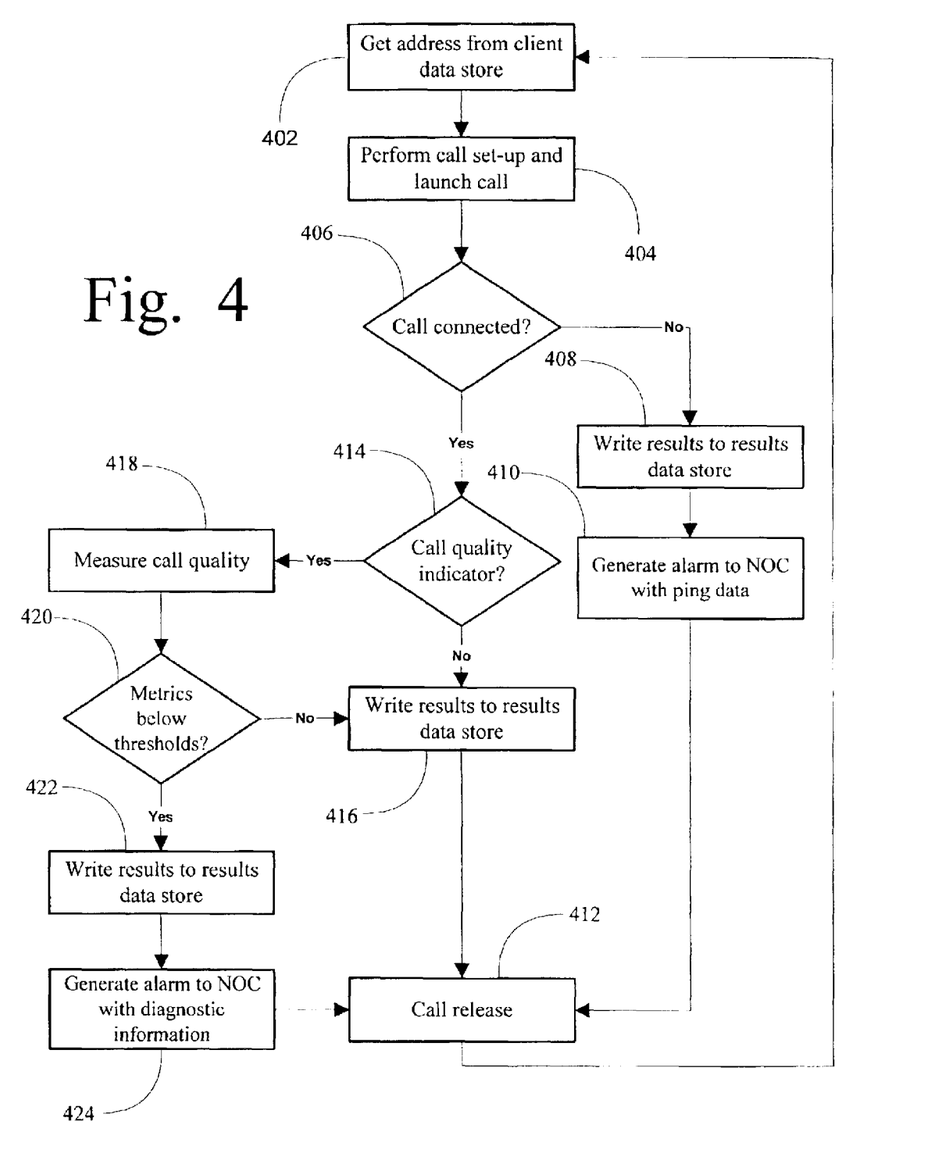
FIG. 4 is a flow diagram presenting a more detailed method for performing an IP telephony ping according to one embodiment of the present invention.

An alternative embodiment of a method for performing a VoIP ping is presented in FIG. 4. In order to perform a VoIP ping, VoIP ping software operating on a VoIP ping server retrieves an address of a VoIP terminal to vping from its client data store, step 402. Based on the address information that the VoIP terminal retrieves from its client data store, software executing on the VoIP terminal launches the call into the network, which performs address resolution, step 404. The VoIP software performs call setup in order to conduct the vping, step 304. Call setup is a mechanism to exchange information necessary to place a call to a VoIP terminal identified during call launch step 404, which is dependent upon the protocol that is being implemented.

Once the call is transmitted over the network for call completion, e.g., address resolution, the VoIP software performs a check to determine the connection status of the call, step 406, for example, whether or not the network successfully resolved the address of the terminal that the VoIP ping software provides or whether the call is successfully routed to the destination terminal. Where the call is unsuccessful, the results are written to the result data store, step 408, and the VoIP software generates an alarm comprising the vping data to the NOC, step 410. If, however, the call connects successfully, e.g., the network properly resolves the address and routes the pint to the intended destination, the VoIP software performs a subsequent check to determine if it should collect call quality metrics, step 414.

The VoIP software determines if it is necessary to collect call quality parameters as opposed to solely attempting to place a call or vping to the VoIP terminal, step 414. The call quality indicator may be supplied to the VoIP software as part of the address data initially passed to the software in step 402 from the client data store. Alternatively, the VoIP software may be configured to periodically or randomly associate a data flag with a given address indicating that it should collect call quality parameters. Where the call quality indicator is present, step 414, the VoIP ping software performs measurements regarding the quality of the vping, step 418, which include, but are not limited to, determining the amount of time to complete the call, voice quality measurements (PAMS/PSQM measurements, etc.), packet loss and latency, echo, etc. These metrics are useful when provided to other software mechanisms that calculate or provide QoS when perform a VoIP call, e.g., the NOC.

Call quality measurements are conducted by the VoIP ping software, step 418, and analysis is performed to determine whether a given metric is falling below a threshold, step 420, which, for example, may be set by an administrator or configured to change dynamically in response to the QoS associated with a given endpoint address. Where one or more given metrics are falling below a threshold, step 420, the results of the analysis are written to a results data store, step 422, and the VoIP ping software generates an alarm comprising diagnostic information gleaned from the VoIP ping and associated call quality analysis to the NOC, step 424. If the call metrics are satisfactory, step 420, or a call quality indicator is not present, step 414, the results are written to a results data store, step 416.

Regardless of whether or not a call quality indicator is present, step 414, the call is torn down once it is established (and any required metrics are collected), step 412. Call tear down ends the current session whereby the VoIP ping server enters and idle state waiting for the VoIP ping software to generate an off hook condition to trigger another call setup, step 402, based on a subsequent address retrieved from the VoIP ping server's client data store.

Figure 5:
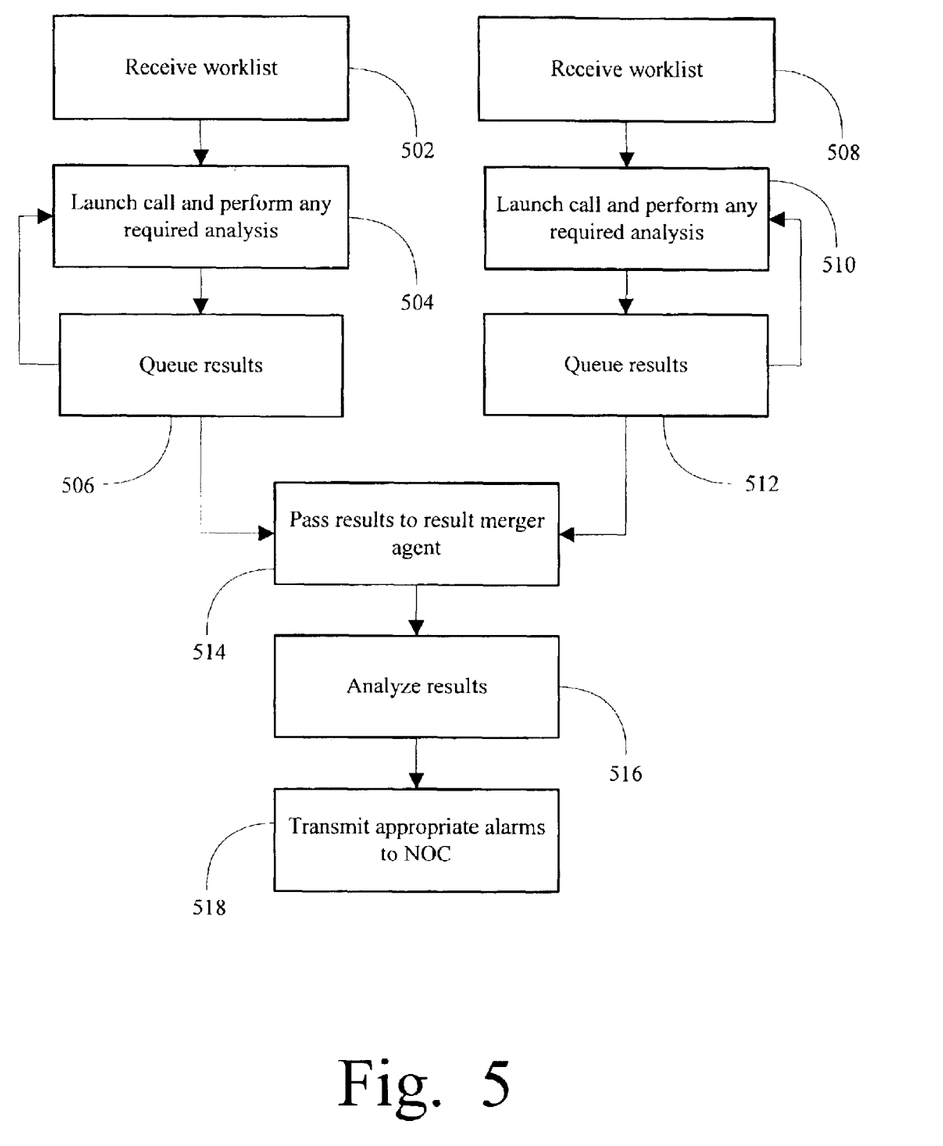
FIG. 5 is a flow diagram presenting a method for performing an IP telephony ping using a high availability architecture according to one embodiment of the present invention.

An embodiment of a method for operating the system illustrated in FIGS. 1 and 2 according to a high availability framework is presented in FIG. 5. A first VoIP ping server executing VoIP ping software communicates with a work distributor or client data store to receive a worklist comprising a set of addresses of one or more VoIP terminals, step 502. The VoIP ping software initiates a call to a given VoIP terminal based on the address information contained in the worklist that the VoIP ping server receives from the work distributor or client data store, step 504. The underlying VoIP network framework performs address resolution and call completion, which varies according to the protocol or protocols implemented in the network as described above, including, but not limited to H.323, SIP and MGCP, all of which are contemplated as operating in conjunction with the systems and methods of the present invention.

In addition to launching the call, the VoIP ping software may collect call metrics regarding the call according to the invention, such as those described above and others well known to those of skill in the art, step 504. The VoIP ping software queues the results of the vping, which may comprise call quality parameters in addition to the success or failure of the call, on a local or remote data storage device, step 506, and retrieves the address of the next VoIP terminal in the worklist, step 504.

Operating in parallel on a second VoIP ping server is VoIP ping software that receives a worklist from the work distributor or client data store comprising addresses of one or more VoIP terminals, step 508. Alternatively, both instances of the VoIP ping software may be executing on a single VoIP ping server. The VoIP ping software initiates a call to a given VoIP terminal based on the address information contained in the worklist that the VoIP server receives from the work distributor or client data store, step 510. The VoIP ping software queues the results of the vping, which may comprise call quality parameters in addition to the success or failure of the call, on a data storage device, step 512, and retrieves the address of the next VoIP terminal in the worklist, step 510.

On a periodic basis, which may be set by a VoIP ping server administrator or similar responsible party or process at the NOC, the result merger agent queries the VoIP ping servers to retrieve the queued vping results, step 514. The result merger agent merges vping data for each VoIP terminal that the VoIP ping servers call; the data preferably arranged according to VoIP terminal to allow for de-duplication, if any. The result merger agent analyzes the vping data to determine those VoIP terminals that are not responding to vpings transmitted to a given address, e.g., those VoIP terminals whose addresses are not resolving properly and therefore are unreachable, step 516.

Furthermore, where call quality metrics are available the result merger agent may analyze those metrics to determine terminals where guaranteed services levels are not being met and generate alarms that are enriched with the call quality metrics to allow the NOC to quickly diagnose problems, step 516. Based on the analysis, the result merger agent transmits or broadcasts alarms to the NOC to inform an administrator that a given VoIP terminal is unavailable or otherwise performing unsatisfactorily and requires attention, step 518.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for establishing the availability of a node to receive a voice over internet protocol (VoIP) call, the system comprising:

one or more VoIP nodes, each VoIP node identified by an endpoint address;

a plurality of work distributors operative to maintain a set of endpoint addresses, the plurality of work distributors synchronizing the endpoint addresses among the plurality of work distributors to maintain a consistent set of endpoint addresses; and a plurality of VoIP ping servers executing VoIP ping software operative to retrieve an endpoint address from a given one of the plurality of work distributors, attempt a VoIP call to the endpoint address and store a result of the VoIP call.

2. The system of claim 1 wherein the plurality of work distributors maintains the endpoint addresses in one or more formats selected from of the group comprising an E.164 address, a private dial plan address, a SIP URL and a MGCP address.

3. The system of claim 1 wherein the VoIP ping software extracts call metrics from a successful call that provide information regarding the quality of a VoIP connection.

4. The system of claim 1 comprising a plurality of result merger agents operative to receive results of a plurality VoIP call from the plurality of VoIP ping servers, process the results and generate an alarm in response to a call failure.

5. The system of claim 4 wherein each result merger agent synchronizes the results it receives with results that other result merger agents receive.

6. The system of claim 1 comprising a plurality of result merger agents operative to receive call metrics from a VoIP call that provide information regarding the quality of a VoIP connection, analyze the metrics against a set of threshold data and generate and alarm in response a given call metric falling below a given threshold within the set of threshold data.

7. A method for establishing the availability of a node to receive a voice over internet protocol (VoIP) call, the method comprising:

attempting to establish a plurality of VoIP calls to a given node that is the target of the VoIP call;

determining whether a given one of the plurality of attempts to establish the VoIP calls is successful;

performing a call teardown once any of the plurality of VoIP calls is established; and generating an alarm in response to a call failure of a given one of the plurality of attempts.

8. The method of claim 7 wherein attempting, determining and generating is conducted at periodic intervals.

9. The method of claim 7 wherein attempting to establish a VoIP call comprises dialing one or more of a E.164 address, a private number plan address, a SIP URL, and a MGCP endpoint address.

10. The method of claim 7 wherein attempting to establish a VoIP call is conducted according to one or more of the Session Initiation Protocol (SIP) and H.323 protocol.

11. The method of claim 7 comprising extracting metrics from a VoIP call that provide information regarding the quality of a VoIP connection.

12. The method of claim 11 comprising generating an alarm in response to the metrics falling below a threshold.

13. A method for establishing the availability of a node to receive a voice over internet protocol (VoIP) call, the method comprising:
    attempting to establish a plurality of VoIP calls to a given node that is the target of the VoIP call;
    determining whether a given one of the plurality of attempts to establish the VoIP calls is successful;
    generating an alarm in response to a call failure of a given one of the plurality of attempts; and
    wherein determining and generating is conducted at periodic intervals.

14. The method of claim 13 comprising performing a call teardown once the VoIP call is established.

15. The method of claim 13 wherein attempting to establish a VoIP call comprises dialing one or more of a E.164 address, a private number plan address, a SIP URL, and a MGCP endpoint address.

16. The method of claim 13 wherein attempting to establish a VoIP call is conducted according to one or more of the Session Initiation Protocol (SIP) and H.323 protocol.

17. The method of claim 13 comprising extracting metrics from a VoIP call that provide information regarding the quality of a VoIP connection.

18. The method of claim 17 comprising generating an alarm in response to the metrics falling below a threshold.

19. A method for establishing the availability of a node to receive a voice over internet protocol (VoIP) call, the method comprising:
    attempting to establish a plurality of VoIP calls to a given node that is the target of the VoIP call;
    determining whether a given one of the plurality of attempts to establish the VoIP calls is successful;
    generating an alarm in response to a call failure of a given one of the plurality of attempts; and
    wherein attempting to establish any of the plurality of VoIP calls comprises dialing one or more of a E.164 address, a private number plan address, a SIP URL, and a MGCP endpoint address.

20. The method of claim 19 comprising performing a call teardown once the VoIP call is established.

21. The method of claim 19 wherein attempting, determining and generating is conducted at periodic intervals.

22. The method of claim 19 wherein attempting to establish a VoIP call is conducted according to one or more of the Session Initiation Protocol (SIP) and H.323 protocol.

23. The method of claim 19 comprising extracting metrics from a VoIP call that provide information regarding the quality of a VoIP connection.

24. The method of claim 23 comprising generating an alarm in response to the call metrics falling below a threshold.

25. A method for establishing the availability of a node to receive a voice over internet protocol (VoIP) call, the method comprising:
    attempting to establish a plurality of VoIP calls to a given node that is the target of the VoIP call;
    determining whether a given one of the plurality of attempts to establish the VoIP calls is successful;
    generating an alarm in response to a call failure of a given one of the plurality of attempts; and
    wherein attempting to establish a VoIP call is conducted according to the Session Initiation Protocol (SIP).

26. The method of claim 25 comprising performing a call teardown once the VoIP call is established.

27. The method of claim 25 wherein attempting, determining and generating is conducted at periodic intervals.

28. The method of claim 25 wherein attempting to establish any of the plurality of VoIP calls comprises dialing one or more of a E.164 address, a private number plan address, SIP URL, and a MGCP endpoint address.

29. The method of claim 25 comprising extracting metrics from a VoIP call that provide information regarding the quality of a VoIP connection.

30. The method of claim 29 comprising generating an alarm in response to the metrics falling below a threshold.

31. A system for establishing the availability of a node to receive a voice over internet protocol (VoIP) call, the system comprising:
    one or more VoIP nodes, each VoIP node identified by one or more of a E.164 address, a private number plan address, a SIP URL, and a MGCP endpoint address; and
    a VoIP ping server executing VoIP ping software operative to attempt a VoIP call to a given one of the one or more VoIP nodes, the VoIP ping software further operative to generate an alarm in response to a call failure.

32. The system of claim 31 wherein the VoIP ping software extracts call metrics from a VoIP call that provide information regarding the quality of a VoIP connection.

33. The system of claim 32 wherein the VoIP ping software generates an alarm in response to the call metrics falling below a threshold.

* * * * *

UNITED STATES PATENT AND TRADEMARK OFFICE
CERTIFICATE OF CORRECTION

PATENT NO.       : 6,940,849 B2
APPLICATION NO.  : 10/417415
DATED            : September 6, 2005
INVENTOR(S)      : Eichen et al.

It is certified that error appears in the above-identified patent and that said Letters Patent is hereby corrected as shown below:

Claim 2 In column 12 at line 36 delete "of"
Claim 6 In column 12 at line 53 after "generate" delete "and" and insert --an --
Claim 6 In column 12 at line 53 after "response" insert --to--
Claim 8 In column 12 at line 68 delete "is" and insert --are--
Claim 21 In column 14 at line 2 delete "is" and insert --are--
Claim 24 In column 14 at line 10 delete "call"
Claim 27 In column 14 at line 26 delete "is" and insert --are--
Claim 29 In column 14 at line 30 before "SIP" insert --a--

Signed and Sealed this

Seventeenth Day of April, 2007

JON W. DUDAS
*Director of the United States Patent and Trademark Office*